April 2, 1968   F. LAZARRE   3,375,802
WINDOWED CELL FOR HIGH-PRESSURE MEASUREMENTS
Filed June 29, 1965   2 Sheets-Sheet 1
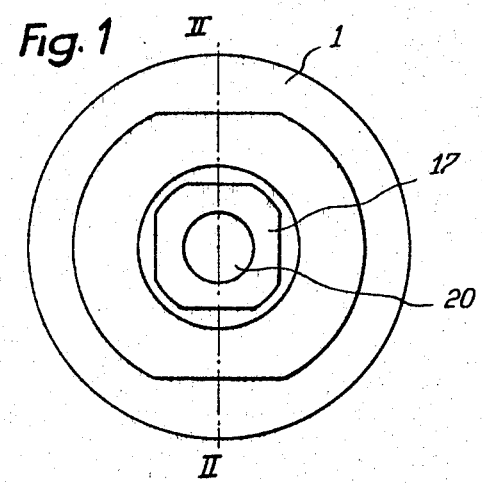
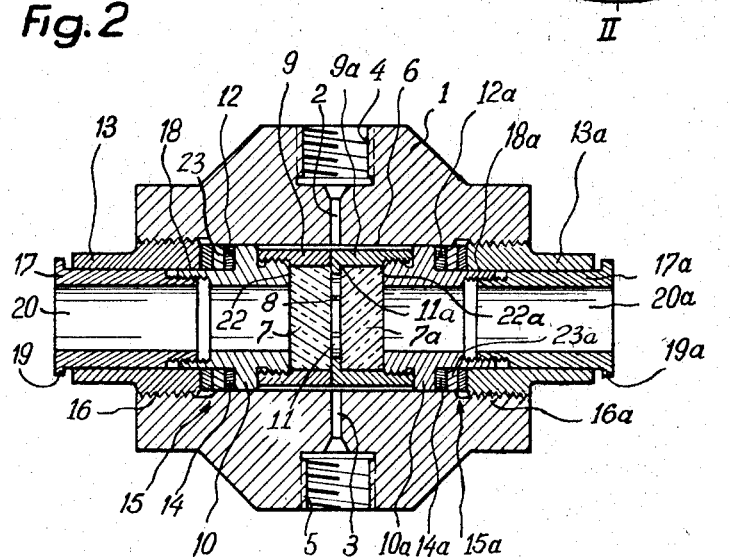
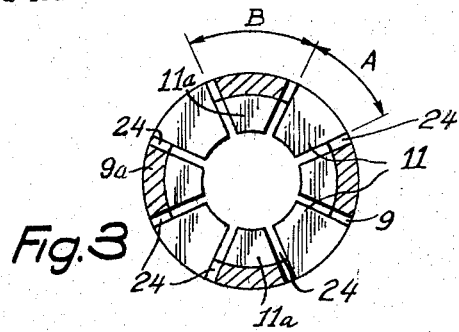
INVENTOR
FLAVIEN LAZARRE
BY
Bacon & Thomas
ATTORNEYS April 2, 1968  F. LAZARRE  3,375,802
WINDOWED CELL FOR HIGH-PRESSURE MEASUREMENTS
Filed June 29, 1965  2 Sheets-Sheet 2

INVENTOR
FLAVIEN LAZARRE
BY
Bacon & Thomas
ATTORNEYS

United States Patent Office 3,375,802
Patented Apr. 2, 1968

3,375,802
WINDOWED CELL FOR HIGH-PRESSURE MEASUREMENTS
Flavien Lazarre, Pau, France, assignor to Société Anonyme dite: Societe Nationale des Petroles d'Aquitaine, Paris, France
Filed June 29, 1965, Ser. No. 468,018
Claims priority, application France, June 30, 1964, 980,112
6 Claims. (Cl. 116—117)

ABSTRACT OF THE DISCLOSURE

A windowed cell capable of withstanding high fluid pressure having a cell body with a fluid inlet, a fluid outlet and an open-ended bore communicating with the inlet and the outlet. A transparent window element held between a bushing and a cap member carried within each end of the bore so that a self-sealing joint is formed where a surface of each window element bears on a bushing, a fluid flow chamber in communication with the inlet and the outlet, formed between the window elements, and plug means screw threadedly mounted at each end of the bore to adjustably retain said caps, bushings and windows in place.

---

This invention relates to a windowed cell for high-pressure measurements.

Known systems for taking measurements on high-pressure fluids are generally provided with glass tubes or thick glass sheets clamped between flanges to allow observation by transmission when two glasses are used and by reflection when a single glass is used. The arrangements used with these systems do not generally allow measurements at pressures of some hundreds of bars and a fortiori in excess of 1,000 bars. Also, these systems do not allow study or measurements to be taken of relatively opaque fluids, because of the design of such systems.

In the system according to the invention, the windowed cell used allows direct observation of phenomena or enables measurements to be taken in or on fluids at pressures ranging up to several thousand bars.

More particularly, the windowed cell according to the invention can be used either mounted in series in a pipeline or in parallel on a tank for checking of high-pressure levels which may be equal to several thousand bars.

According to the invention, the two cell windows are mounted on the principle of the self-sealing joint, which provides increasing sealing with increasing pressure. This system is achieved by a polished ground-in flat contact between the windows and bushes, the optical viewing aperture at the centre of the bushes being selected in accordance with the pressures and in such manner that the amount of self-sealing between the windows and bushes is compatible with the characteristics of the materials used. The nature of the material is selected according to the radiation used (visible light, ultra-violet light, X-rays, $\gamma$-rays etc.). The window bushes are also provided with sealing means independent of the sealing means for each window.

According to several embodiments of the invention, the distance between the inner surfaces of the windows, i.e., the space for discharge of the fluid under study, is adjustable before assembly from one-tenth of a millimetre without a spacer to one or more centimetres by means of a detachable spacer system. According to the invention this space can be adjusted, of course, according to requirements from less than one-tenth of an mm. to one metre or more. Also, when the cell is in operation, a movable stop system interposed between the bush and cap allows the space between the windows to be adjusted if necessary. This system is used to compensate for any variations in the space between the windows as a result of the action of the very high pressures, for example squeezing of the gaskets, or else the space can be adjusted to meet measuring requirements, the space between the windows being adjusted even when the pressure has been built up in the cell.

According to another feature of the invention, the retaining cap for the observation discs of each window is so produced as to allow interfitting with that of the second window, pre-clamping of the windows and free circulation of the fluid under study through the spaces in the form of radial groves.

According to the invention, a cell body comprises a bore in which two windows transparent to the radiation used are disposed symmetrically in the central part of said bore, said windows bounding between them a flow chamber for the fluid understudy, the said windows being mounted through the agency of retaining caps on bushes by means of a self-sealing joint formed by the surface whereby the windows bear on the bushes, and also by a gasket disposed between the bush and the retaining plugs which are screwed to the two ends of the body.

Other advantageous features of the invention will be apparent from the following description of one embodiment which is given solely by way of example without any limiting force, with reference to the accompanying drawing, wherein:

FIGURE 1 is an end view of the windowed cell.

FIGURE 2 is a section of the windowed cell along the line II—II in FIGURE 1.

FIGURE 3 is a detail view, partly in section, of the window support caps showing the relative position of the lugs of the caps fitted together to provide radial fluid flow passages.

Figure 4:
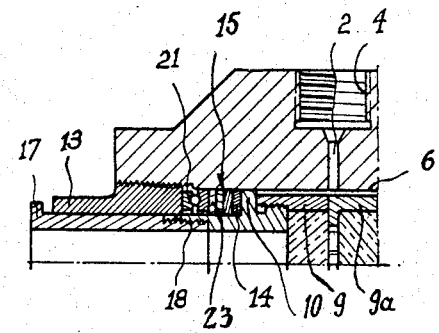
FIGURE 4 is a sectional view of a second embodiment with a mean space between the windows.

The system according to the invention as illustrated in FIGS. 1 and 2 comprises a cell body 1 in which are formed two fluid flow conduits 2, 3 which extend out of the cell body via tapped bores 4, 5 into which are screwed the ends of the pipelines for the fluid under observation. In the example illustrated, these bores are disposed diametrically but other arrangements can be adopted.

Transparent windows or lenses 7, 7a are provided in the central part of a bore 6 which is formed at right-angles to the conduits 2 and 3 and into which the latter extend inwardly, the windows bounding between them a fluid flow chamber 8 communicating with the conduits 2, 3.

Each of the windows 7, 7a is formed by a disc of suitable material selected according to the nature of the radiation used and required to pass through the windows (visible or ultra-violet light, X-rays, $\gamma$-rays etc.). The windows fit in caps 9, 9a screwed on to bushes 10, 10a and are retained on one of their surfaces by lugs 11 formed on one of the ends of the caps 9, 9a, and are retained on the other surface by the bushes 10, 10a against which they abut by a face 22, 22a which forms a self-sealing joint between the windows 7, 7a and the bushes 10, 10a.

The lugs 11 of the cap 9 (FIG. 3) fit into the lugs 11a of the cap 9a so as to ensure the free flow of fluid under study through spaces in the form of radial grooves 24 between the lugs and extending over a sector A less than the sector B separating two contiguous lugs. The thickness of these lugs determines the minimum spacing between the windows.

The bushes 10, 10a also abut plugs 13, 13a by shoulders 12, 12a spacers 15, 15a being interposed, and the said plugs 13, 13a have a screwthreaded end 16, 16a by which they are screwed into the cell body 1.

In this way, the bushes 10, 10a connected to the windows 7, 7a receive the thrust resulting from the application of the fluid pressure to the windows and compress the gasket with an increasing force with increasing pressure, on the principle of the self-sealing joint.

Extraction heads 17, 17a in the form of bushes are screwed by one of their screwthreaded ends 18, 18a into the bushes 10, 10a and enable the bush and window assembly to be extracted by unscrewing of the plug 13 while their rear annular shoulders 19, 19a allow the gaskets 14, 14a to be pre-clamped if necessary before pressurisation.

Figure 5:
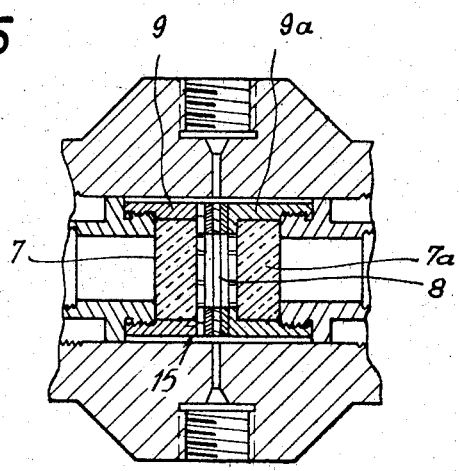
FIGURE 5 is a sectional view of a third embodiment with a larger space between the windows.

As shown in FIG. 5, spacing of the windows 7, 7a may be varied by variation of the thickness of the spacers 15 placed between the windows and in this latter case the width of the chamber 8 may vary within wide limits.

The spacers 15, 15a are generally in the form of packing rings or gaskets 14, 14a and washers 23, 23a. These spacers enable the spacing of the windows to be adjusted before operation, whether they are disposed between the plugs 13, 13a and the bushes 10, 10a as in FIGS. 2 and 4 or between the window-bearer caps 9 and 9a as in FIG. 5.

A system with a spacer thickness of about 3 mm. is shown in FIGS. 4 and 5 with a mean and a maximum space, respectively, between the windows.

Ball stops 21, 21a connected to the plugs 13, 13a and disposed between the latter and the spacers 15, 15a enable any play due to squeezing of the gaskets 14, 14a to be taken up during operation.

Partial unscrewing of the plugs 13, 13a adjusts the space between the windows 7, 7a while pressure is built up in the cell. The fluid pressure acting on the bushes 10, 10a either directly or indirectly via the caps 9, 9a and the windows 7, 7a moves the latter outwards in proportion as the plugs 13, 13a are withdrawn by being unscrewed in the outward direction.

As will be apparent from FIGS. 1 and 2, the bushes 10, 10a and extraction heads 17, 17a are so assembled as to form an aperture through which radiation is admitted; in the specific case of FIG. 2 this aperture is cylindrical.

Of course the invention is not limited to the embodiment described and illustrated but covers all variations thereof as fall within the scope of the appended claims.

I claim:

1. A windowed cell capable of withstanding high fluid pressure comprising: a cell body having a fluid inlet, a fluid outlet and an open-ended bore communicating with said inlet and said outlet; a bushing and a cap member carried within each end of said bore; each bushing and cap member holding therebetween a transparent window element so as to form a self-sealing joint where a surface of the window elements bear on the bushings; said window elements forming therebetween a flow chamber which is in communication with said inlet and said outlet; and plug means screw threadedly mounted within said bore adjustably retaining said caps, bushings and windows in place.

2. A cell according to claim 1 wherein at least one spacer ring is interposed between each bushing means and the corresponding plug means, said spacer ring, partly surrounding the corresponding bushing and mounted to be slidable with respect to the latter, and wherein a ball stop is interposed between each of the said plug means and the corresponding spacer ring.

3. A cell according to claim 1, wherein the window caps have retaining lugs situated within the flow chamber and adapted to fit in one another to bound fluid flow spaces in the form of radial grooves.

4. The cell of claim 1, further including an extractor cap partially screwed into each bushing; each of said extractor caps being movably surrounded by one of said plugs and including an annular shoulder at its end opposite to that screwed into the bushing so as to cooperate with an end of said plug means.

5. The cell of claim 1, wherein each of said plug means surrounds the outer end of the respective bushing means and is mounted so as to be slidable with respect thereto.

6. The cell of claim 1 in which at least one spacer is interposed between each bushing and plug means so as to seal said bushings in said bore.

References Cited

UNITED STATES PATENTS

| 2,681,034 | 6/1954 | Mannion | 116—117 |
| 2,690,695 | 10/1954 | Coates | 116—117 |
| 3,014,981 | 12/1961 | Appl | 73—331 |
| 3,125,882 | 3/1964 | Johnson et al. | 116—117 |
| 3,177,706 | 4/1965 | Shuman et al. | 116—117 |

FOREIGN PATENTS 884,020  12/1961  Great Britain.

LOUIS J. CAPOZI, *Primary Examiner.*